(12) United States Patent
Niwa et al.

(10) Patent No.: US 7,199,952 B2
(45) Date of Patent: Apr. 3, 2007

(54) COLOR WHEEL, AND COLOR WHEEL ASSEMBLY INCORPORATING SAME

(75) Inventors: Shinichi Niwa, Iwata-gun (JP); Toshiaki Asakawa, Iwata-gun (JP); Shigeyuki Adachi, Iwata-gun (JP); Kuniyuki Takao, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 11/090,203

(22) Filed: Mar. 28, 2005

(65) Prior Publication Data

US 2006/0126198 A1 Jun. 15, 2006

(30) Foreign Application Priority Data

Dec. 10, 2004 (JP) ............................. 2004-358112

(51) Int. Cl.
*G02B 5/22* (2006.01)
*G03B 21/14* (2006.01)

(52) U.S. Cl. .................. 359/892; 359/889; 353/84

(58) Field of Classification Search ................ 359/892, 359/891, 889; 353/84
See application file for complete search history.

(56) References Cited

U.S. PATENT DOCUMENTS

| | | | | |
|---|---|---|---|---|
| 3,441,351 | A * | 4/1969 | Bell et al. .................... 356/404 |
| 4,533,212 | A * | 8/1985 | Shimizu ..................... 359/892 |
| 4,800,474 | A | 1/1989 | Bornhorst |
| 4,922,333 | A * | 5/1990 | Nutting et al. .............. 358/506 |
| 5,257,332 | A | 10/1993 | Pimpinella |
| 5,868,482 | A | 2/1999 | Edlinger et al. |
| 6,011,662 | A * | 1/2000 | Evans ........................ 359/891 |
| 6,024,453 | A * | 2/2000 | Edlinger et al. .............. 353/84 |
| 6,574,046 | B1 | 6/2003 | Shioya |
| 6,702,446 | B2 | 3/2004 | De Vaan et al. |
| 6,715,887 | B2 | 4/2004 | Chang |
| 6,813,087 | B2 | 11/2004 | Davis |
| 6,896,376 | B2 * | 5/2005 | Chin et al. .................... 353/84 |
| 2002/0005914 | A1 | 1/2002 | Tew |
| 2002/0105729 | A1 | 8/2002 | Richards et al. |
| 2003/0142241 | A1 | 7/2003 | Allen et al. |
| 2004/0095767 | A1 | 5/2004 | Ohmae et al. |
| 2005/0018145 | A1 | 1/2005 | Kwon et al. |

FOREIGN PATENT DOCUMENTS

| JP | A 03-122903 | 5/1991 |
|---|---|---|
| JP | A 05-090391 | 4/1993 |

(Continued)

*Primary Examiner*—Audrey Chang
(74) *Attorney, Agent, or Firm*—Oliff & Berridge, PLC

(57) ABSTRACT

There is provided a color wheel including a plurality of color filters arranged so as to form a disk, and a retainer member disposed at a center of the disk and formed into a C-ring defining an open mouth portion through which an area of one color filter is exposed. Also, there is provided a color wheel assembly which incorporates the color wheel described above, and which further includes a motor to rotate the color wheel, and a rotational position detector to optically detect a rotational position of the color wheel. Detection light emitted from the detector is set to fall incident on the C-ringed retainer member while the color wheel is rotated thus intermittently impinging on the open mouth portion, namely on the one color filter, which causes the detection light reflected thereby to come out with two different intensities that are sensed by the detector.

2 Claims, 4 Drawing Sheets

FOREIGN PATENT DOCUMENTS

| | | |
|---|---|---|
| JP | A 06-347639 | 12/1994 |
| JP | 10-048542 | 2/1998 |
| JP | A 11-115711 | 4/1999 |
| JP | A 11-222664 | 8/1999 |
| JP | A 2000-239830 | 9/2000 |
| JP | A 2001-073136 | 3/2001 |
| JP | A 2003-050309 | 2/2003 |
| JP | A 2003-057424 | 2/2003 |
| JP | A 2004-101827 | 4/2004 |
| WO | WO 94/25796 | 11/1994 |

\* cited by examiner

COLOR WHEEL, AND COLOR WHEEL ASSEMBLY INCORPORATING SAME

BACKGROUND OF THE INVENTION

1. Field of the Invention

The present invention relates to a color wheel suitable as a filter element for a color wheel assembly as a time-share light dispersing device, and a color wheel assembly incorporating such a color wheel.

2. Description of the Related Art

Recently, a projection-type image display apparatus is increasingly coming with a time-sharing single-panel method, in which R (red), G (green), and B (blue) lights are sequentially shed to fall incident on one single light valve element such as a digital micro-mirror device capable of fast switching while the light valve element is driven in synchronization with switching of the incident lights (R, G and B), whereby R, G and B images are produced in a time-series manner and projected sequentially onto a screen, or the like. Here, color composition of the images is accomplished by a viewer due to an afterimage effect occurring at a sense of vision. In the time-sharing single-panel method, reduction in both dimension and weight of the apparatus, which is a feature of a single-panel method, can be achieved by employing a relatively simple optical system, and therefore the time-sharing single-panel method is favorable for realizing inexpensive fabrication of a projection-type image display apparatus. In such an image display apparatus, a color wheel is preferably used as a filter element of a time-share color wheel assembly to sequentially disperse light emitted from a white light source into R, G and B lights having respective wavelength bands in a time-sharing manner.

FIGS. 5A and 5B are respectively top plan and side views of a conventional and typical color wheel assembly 200 as a time-share light dispersing device including such a color wheel. Referring to FIG. 5B, the color wheel assembly 200 comprises a color wheel 100, and a driving motor 106 including a motor hub 105. The color wheel 100 is a tricolor color wheel composed of a disk-like substrate 101 which is made of a light-transmitting material, for example, optical glass, and three pie-shaped (sectorial) filters 102, 103 and 104 which are formed on a surface of the substrate 101, and which transmit exclusively, for example, R, G and B lights, respectively. The color wheel 100 thus structured is fixedly attached to the motor hub 105 coaxially therewith. The color wheel assembly 200 operates such that the color wheel 100 is spun by the driving motor 106 so that white light S impinges sequentially on the filters (R, G and B) 102, 103 and 104 whereby the white light S is sequentially dispersed into R, G and B lights.

There are two types of color wheels. One is a segment-type color wheel comprising a plurality of color filter segments prepared separately and arranged so as to form a disk, and the other is a monolithic-type color wheel structured such that a plurality of color filters are formed on a single disk-like substrate.

FIGS. 6 and 7 are respectively top plan and exploded side sectional views of a segment-type color wheel 160 comprising a plurality (four in FIG. 6) of color filter segments (hereinafter referred to as segments as appropriate) 112, 114, 116 and 118 which are separately prepared and are fixed in position by means of a support member 120 and a clamp member 122 so as to form a disk. The clamp member 122 also functions to fixedly couple the color wheel 160 to the motor hub 105 of the driving motor 106, and a coupling means like the clamp member 122 with such a function is usually used when a monolithic-type color wheel, which has color filters formed integrally on a single substrate thus not requiring a supporting means like the support member 120, is coupled to the motor hub 105 of the driving motor 106.

In such a color wheel assembly, a color wheel must be rotated in synchronization with the operation of a light valve element in order to appropriately produce images as described above, and therefore a detector to detect the rotational position of the color wheel is required. For example, an optical detector for rotational position is provided, in which detection light is radiated onto the color wheel, and variation of reflected light due to the rotation of the color wheel is sensed, whereby the rotational position is detected. In such a detector, a mark member 125, for example a tape, is provided on a portion of the clamp member 122 as shown in FIGS. 6 and 7. The mark member 125 is either larger or smaller in reflectance than the clamp member 122, and a detector (not shown) is disposed so as to direct its detection light to fall incident on the clamp member 122. The detection light is reflected so as to come out with two different intensities alternately when the color wheel 160 is rotated, and the difference in intensity is sensed whereby the rotational position of the color wheel 160 is detected (refer to FIG. 2 in Japanese Patent Application Laid-Open No. H10-48542).

In the conventional color wheel and color wheel assembly as described above, such a mark member is formed by painting, taping, and the like, and additional component and process are required thus incurring a cost increase.

SUMMARY OF THE INVENTION

The present invention has been made in light of the above problem, and it is an object of the present invention to provide a color wheel whose rotational position can be optically detected through a combination of a color filter and a retaining means only, and also to provide a color wheel assembly incorporating such a color wheel.

In order to achieve the object described above, according to a first aspect of the present invention, a color wheel is provided which comprises a plurality of color filters arranged so as to form a disk configuration, and a retainer member disposed at a center of the disk configuration. The retainer member is formed into a C-ring defining an open mouth portion.

According to a second aspect of the present invention, a color wheel assembly is provided which incorporates the color wheel as described in the first aspect, and which further includes a motor to rotate the color wheel, and a rotational position detector emit detection light for optically detecting a rotational position of the color wheel. The detection light is set to fall incident on the retainer member so as to intermittently impinge on the open mouth portion when the color wheel is rotated.

In the second aspect of the present invention, the detection light impinging on the open mouth portion of the retainer member may be focused upon the color filter.

The color wheel and the color wheel assembly structured as described above work so as to produce advantages to be discussed hereinafter.

DETAILED DESCRIPTION OF THE PREFERRED EMBODIMENTS

The present invention will hereinafter be described with reference to the accompanying drawings.

Figure 1:
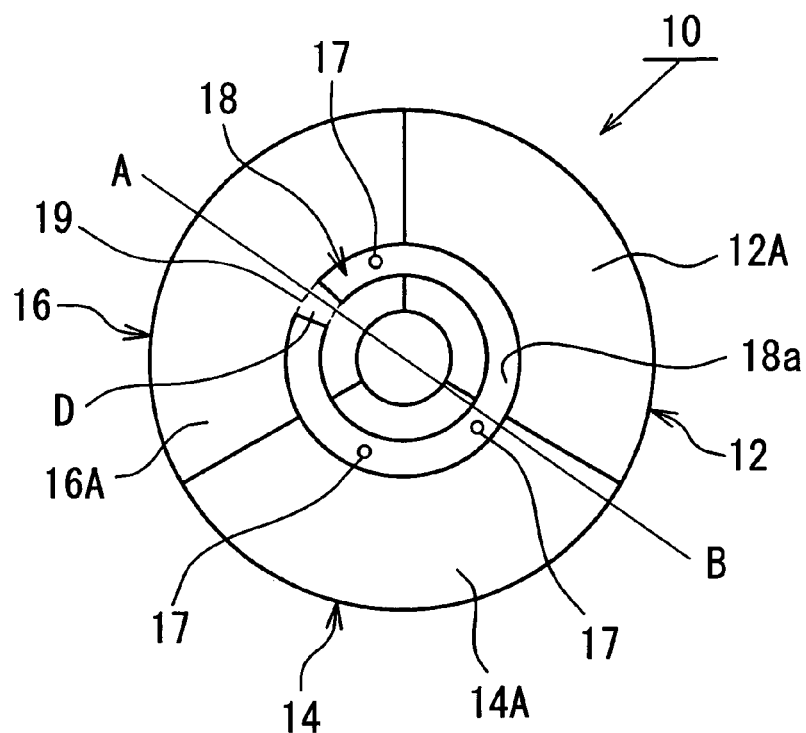
FIG. 1 is a plan view of a color wheel according to a first embodiment of the present invention.

Referring to FIG. 1, a color wheel 10 according to a first embodiment of the present invention is a segment-type color wheel which comprises a plurality of sectorial color filter segments 12, 14 and 16 (hereinafter referred to simply as segments as appropriate) arranged so as to form a disk, and a retainer member 18 disposed at the center of the disk and having a plurality (three in the figure) of balancing holes 17. The segments 12, 14 and 16 have color filters 12A, 14A and 16A, respectively, formed thereon and adapted to transmit respective lights having wavelength bands different from one another. In the present embodiment, the color filters 12A, 14A and 16A are constituted by dichroic filters each formed of a dielectric multilayer film. Also, in the present embodiment, the retainer member 18 is formed into a C-ring made of, for example, a metal material such as aluminum, or a resin material, and is disposed on the color wheel 10 such that the open mouth of the C-ring is located at the segment 16. This arrangement of the retainer member 18 results in forming an annular region 19 consisting of an upper surface 18a of the retainer member 18 and an area D of the color filter 16A exposed through the open mouth of the C-ring-shaped retainer member 18. The retainer member 18 is fixed to the color wheel 10 by adhesive in the figure, but may alternatively be fixed mechanically such that protrusions to be formed on the retainer member 18 are engaged into holes to be formed at the segments 12, 14 and 16 with or without adhesive applied.

Figure 2:
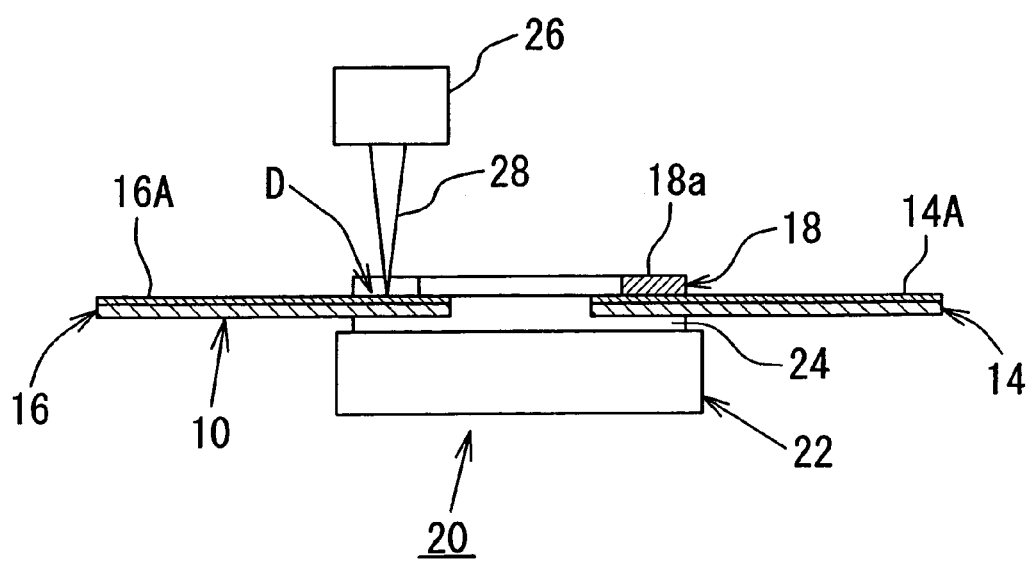
FIG. 2 is an explanatory side view of a relevant portion of a color wheel assembly incorporating the color wheel of FIG. 1 (cross-sectioned along line A-B)

Referring now to FIG. 2, a color wheel assembly 20 incorporates the above-described color wheel 10 shown in FIG. 1 (sectioned along line A-B for the convenience of explanation), and further comprises a motor 22 including a hub 24 and adapted to rotate the color wheel 10, and a rotational position detector 26 to detect the rotational position of the color wheel 10. The color wheel 10 is fixed to the hub 24 of the motor 22 by adhesive means, or mechanical means such as press-fitting, screwing, or combination of the both. In FIG. 2, the color wheel 10 and the hub 24 are attached directly to each other, but may alternatively be attached via a support member which is optionally provided on a side surface of the color wheel 10 opposite to a side surface having the retainer member 18.

The rotational position detector 26 is a device to optically detect the rotational position of the color wheel 10, specifically such that detection light 28 is emitted so as to fall incident on the color wheel 10 rotating, is reflected back and received by the rotational position detector 26 which then senses variation in the intensity of the reflected detection light 28 appearing during the rotation of the color wheel 10, whereby the rotational position of the color wheel 10 is detected. In the present embodiment, the rotational position detector 26 is set so as to emit the detection light 28 on the side surface of the color wheel 10 having the retainer member 18, more specifically on the annular region 19 (refer to FIG. 1), thus the detection light 28 is adapted to impinge on the retainer member 18 and intermittently on the area D during the rotation of the color wheel 10. In this connection, the optical system of the rotational position detector 26 includes a light condensing means (not shown in the figure), for example, an optical lens so that the detection light 28 incident on the area D is focused upon the color filter 16A as schematically illustrated in FIG. 2.

The color wheel 10 and the color wheel assembly 20 structured as described above function as follows.

Supposing that the detection light 28 is R light, and that the color filter 16A is adapted to transmit R light, then the detection light 28, which is set to fall incident on the annular region 19 composed of the upper surface 18a of the retainer member 18 and the area D of the filter 16A as described above, is reflected on the upper surface 18a of the retainer member 18 at a certain reflectance defined by the material of the retainer member 18, and passes completely through the area D of the color filter 16A thus resulting in defining a reflectance of substantially 0%. Since such an extremely low reflectance cannot be achieved generally by a single material such as metal and resin of which the retainer member 18 is made, the detection light 28 reflected at the annular region 19 comes up with two different intensities alternately during the rotation of the color wheel 10, and the difference in intensity is sensed by the rotational position detector 26.

Supposing now that the detection light 28 is R light, and that the color filter 16A is adapted to transmit light (for example, G light or B light) other than R light, then the detection light 28 is reflected on the upper surface 18a of the retainer member 18 at a certain reflectance defined as described above, and is fully reflected on the area D of the color filter 16A thus resulting in defining a reflectance of substantially 100%. Since such an extremely high reflectance cannot be achieved generally by a single material such as metal and resin of which the retainer member 18 is made, the detection light 28 reflected at the annular region 19 comes up with two different intensities alternately during the rotation of the color wheel 10, and the difference in intensity is sensed by the rotational position detector 26.

Figure 6:
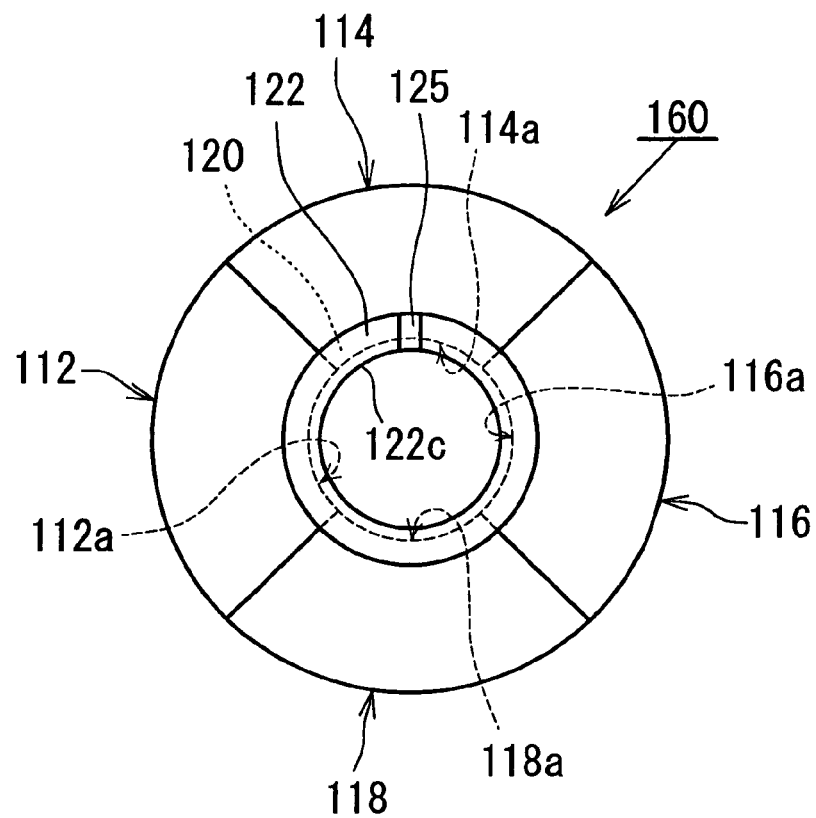
FIG. 6 is a plan view of a conventional segment-type color wheel.
Figure 7:
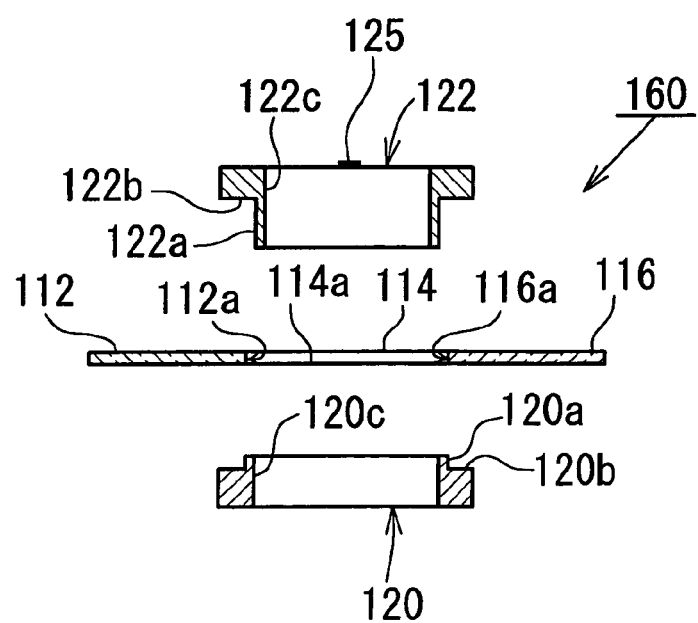
FIG. 7 is an exploded cross-sectional view of FIG. 6.

Thus, in the color wheel 10 according to the present embodiment, the area D, which is equivalent to the mark member 125 in the conventional color wheel 160 (refer to FIGS. 6 and 7) and works for optically detecting the rotational position of the color wheel 10, is formed readily at the annular region 19, without using any additional components and processes, when the retainer member 18 is attached to the segments 12, 14 and 16. And, in the color wheel assembly 20 incorporating the color wheel 10, the area D is optically sensed, and the rotational position of the color wheel 10 is surely detected.

A dichroic filter formed of a dielectric multilayer film has a very high wavelength tunability about spectroscopic properties as described above, and therefore is suitable for use as a color filter in the present invention, but the present invention is not limited thereto and may alternatively use any color filter defining a reflectance that makes such a difference from the reflectance of the material for the retainer member 18 as to be duly sensed by the rotational position detector 28. Also, in the above discussion of the present embodiment, the detection light 28 is R light and the color filters 12A, 14A and 16A are light transmission-type, but the present invention is not limited to such a arrangement, and the detection light 28 may have a wavelength different from R light, and the color filters 12A, 14A and 16A may be light reflection-type, wherein an appropriate combination of the wavelength and the color filter type is selected depending on the specifications of the color filers 12A, 14A and 16A, the retainer member 18, and the rotational position detector 28.

Further, since there exists a difference in level corresponding to the thickness of the retainer member 18 between the upper surface 18a of the retainer member 18 and the color filter 16A, and since the detection light 28 incident on the area D is focused upon the color filter 16A, the light detection light 28 comes up with two different reflection conditions, such as a beam diameter, a light intensity per area, and the like, which, according to the distance from the light emitting system of the rotational position detector 26, are generated respectively at reflection on the upper surface 18a of the retainer member 18 and at reflection on the color filter 16A. Consequently, even if there is not a sensible difference in reflectance between the area D and the upper surface 18a of the retainer member 18, the rotational position detector 26 can sense the difference in the reflection conditions thus enabling detection of the rotational position of the color wheel 10. The rotational position of the color wheel 10 can be better detected by sensing the differences in both the reflectance and the reflection conditions. In this connection, the level difference between the upper surface 18a of the retainer member 18 and the color filter 16A preferably should be large in order to increase the dynamic range of detection, and therefore the color filter 16A may be formed on a side surface of the color wheel 10 opposite to a side surface having the retainer member 18.

A second embodiment of the present invention will hereinafter be described with reference to FIGS. 3A, 3B and 4. In explaining the second embodiment, any component parts identical with those in the first embodiment are denoted by the same reference numerals, and an explanation thereof will be omitted below.

Figure 3A:
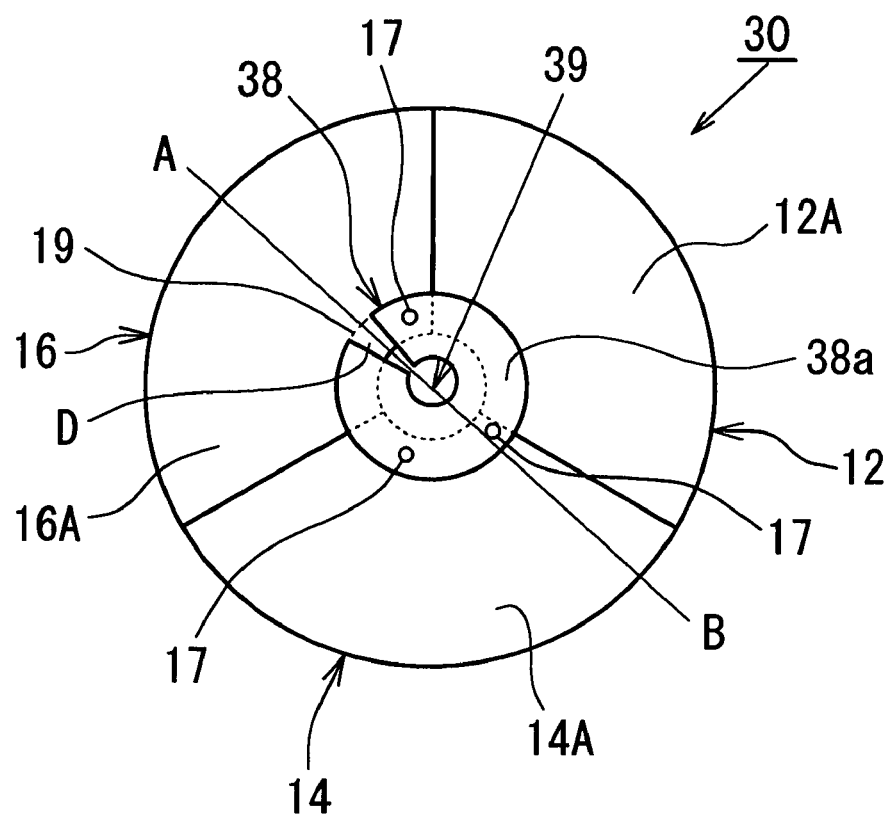
FIG. 3A is a plan view of a color wheel according to a second embodiment of the present invention.
Figure 3B:
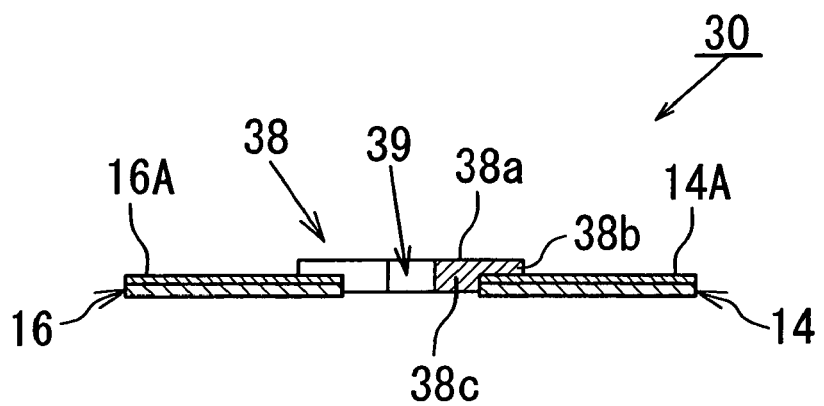
FIG. 3B is a cross-sectional view of FIG. 3A taken along line A-B.

Referring first to FIGS. 3A and 3B, a color wheel 30 according to the second embodiment comprises a retainer member 38 shaped substantially into a two-staged C ring which is composed of a large annular portion 38b including an open mouth, and a small annular portion 38c integrally connected to the large annular portion 3b coaxially and including an open mouth formed continuous with the open mouth of the large annular portion 38b, and which defines a center hole 39. Color filter segments 12, 14 and 16 are fixed to the retainer member 38 such that the segments 12, 14 and 16 are fitted to the outer circumference of the small annular portion 38c so as to form a disk and adhesively fixed to the large annular portion 38b.

Figure 4:
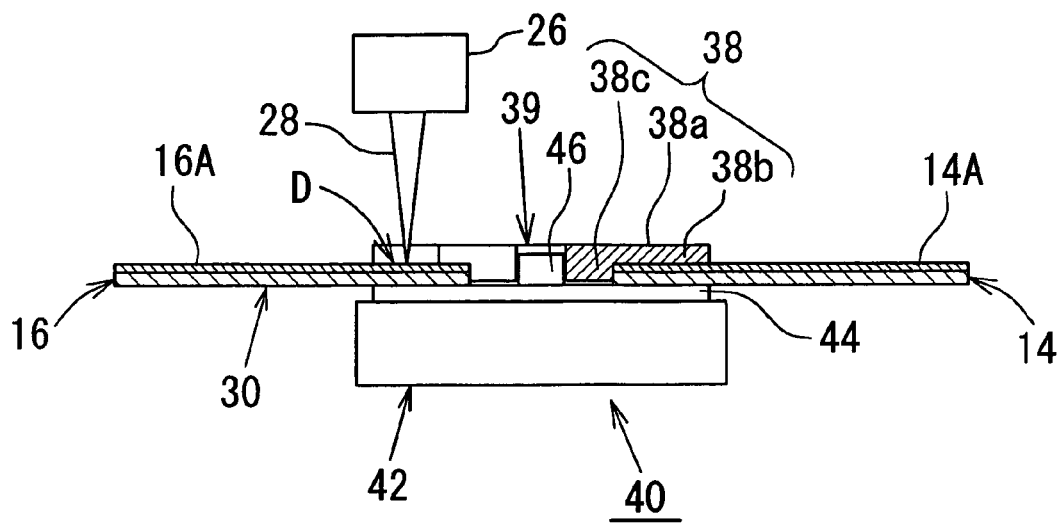
FIG. 4 is an explanatory side view of a relevant portion of a color wheel assembly incorporating the color wheel of FIGS. 3A and 3B.
Figure 5A:
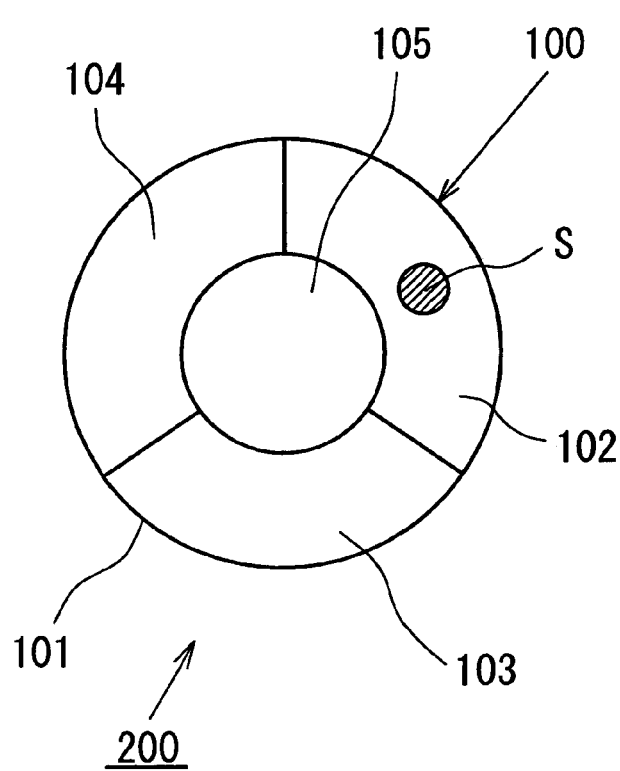
FIG. 5A is a plan view of a typical color wheel assembly incorporating a conventional color wheel.
Figure 5B:
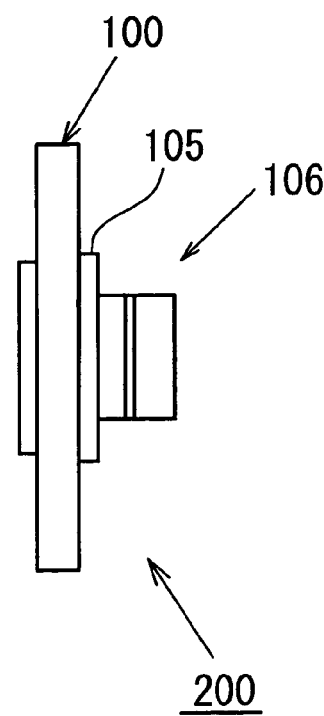
FIG. 5B is a side view of FIG. 5A.

Referring then to FIG. 4, a color wheel assembly 40 incorporates the above-described color wheel 30 shown in FIGS. 3A and 3B, and further comprises a motor 42 including a hub 44, and a rotational position detector 26. As known from FIG. 4, the color wheel 30 according to the present embodiment is suitable especially when a protrusion 46 such as a rotary shaft is provided on the hub 44. Specifically, in the color wheel assembly 40, the color wheel 30 is fixedly attached to the motor 42 adhesively or mechanically (press-fitting, screwing, or the like) in the same way as in the color wheel assembly 20 according to the first embodiment, where the center hole 39 of the retainer member 38 functions as an axis hole to engagingly receive the protrusion 46. In the present embodiment, since the retainer member 38 is formed into a C-ring with an open mouth, the protrusion 46 is easily press-fitted into the center hole 39 and then also stays securely engaged therewith thus surely preventing the color wheel 30 from getting scattered off.

In the above embodiments, the color wheel is described as segment type, but the present invention may alternatively be applied to a monolithic type color wheel provided with a coupling member for attachment to a motor, in such a manner that the coupling member is formed into a C-ring with an open mouth like the retainer member of the present invention. This gives the same advantages as described above.

While the present invention has been illustrated and explained with respect to specific embodiments thereof, it is to be understood that the present invention is by no means limited thereto but encompasses all changes and modifications that will become possible within the scope of the appended claims.

What is claimed is:

1. A color wheel assembly comprising:
   a color wheel including a plurality of color filters arranged so as to form a disk configuration, and a retainer member disposed at a center of the disk configuration and formed into a C-ring defining an open mouth portion, the open mouth portion overlaping one of the plurality of color filters;
   a motor to rotate the color wheel; and
   a rotational position detector to emit detection light being set to fall incident on and along the retainer member so as to intermittently impinge on the open mouth portion when the color wheel is rotated, wherein the rotational position detector optically detects a rotational position of the color wheel with a reflected detection light, sensing variation in intensity thereof between the open mouth portion and the retainer member.

2. A color wheel assembly according to claim 1, wherein the detection light impinging on the open mouth portion of the retainer member is focused upon the color filter.

* * * * *